Feb. 19, 1952     H. SCHOTTLER     2,586,725
VARIABLE-SPEED TRANSMISSION
Filed Feb. 6, 1951     2 SHEETS—SHEET 1
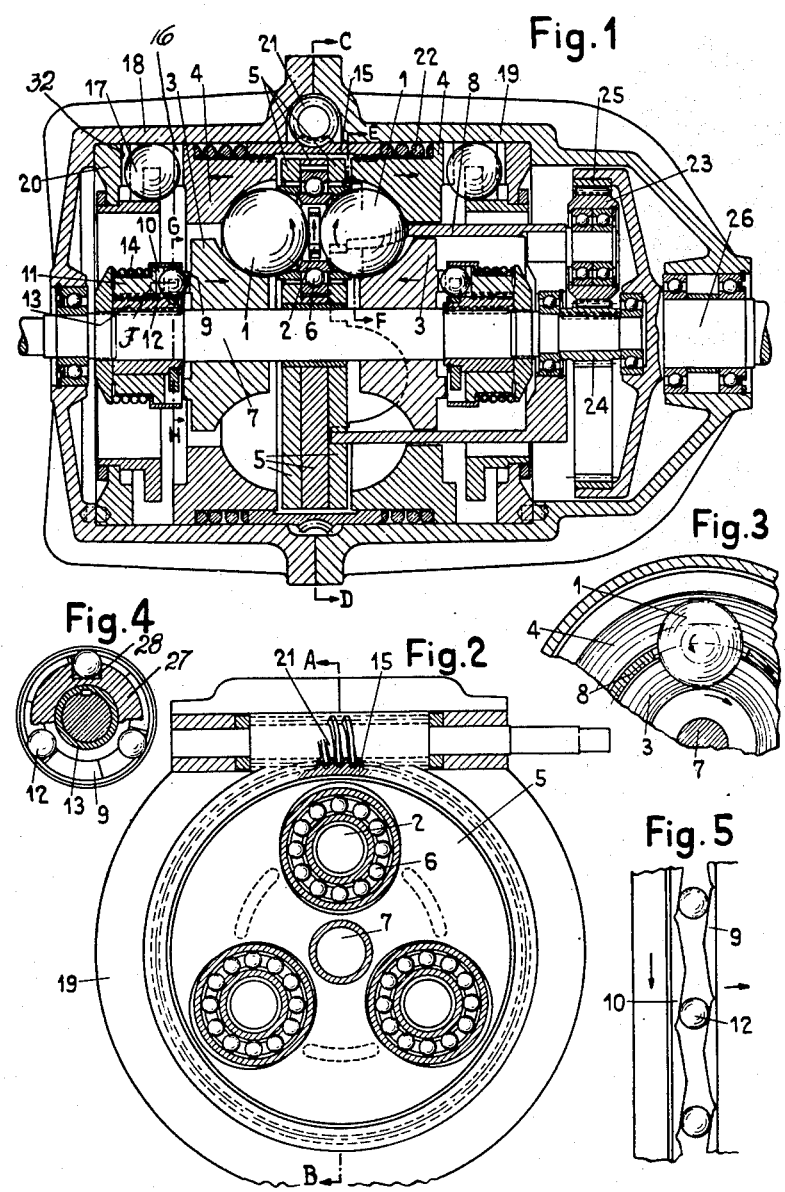
INVENTOR
HENRY SCHOTTLER

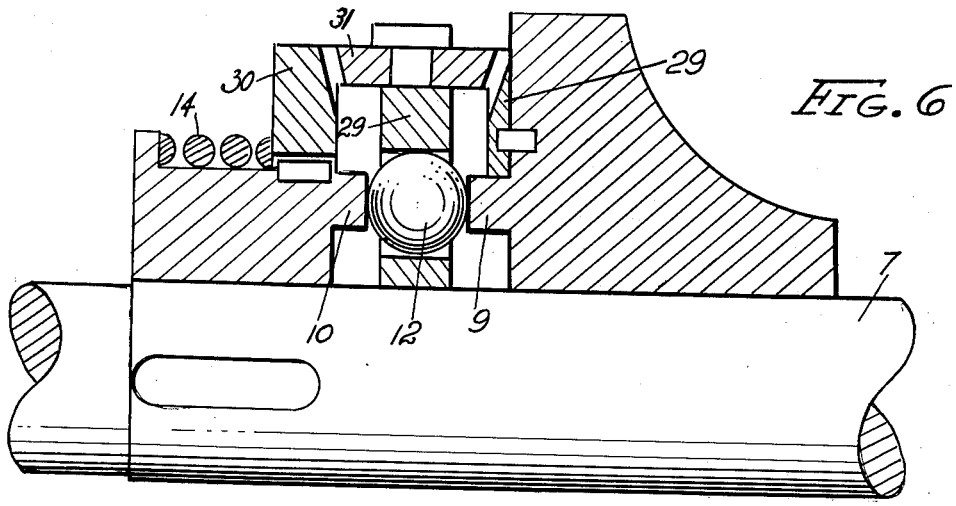
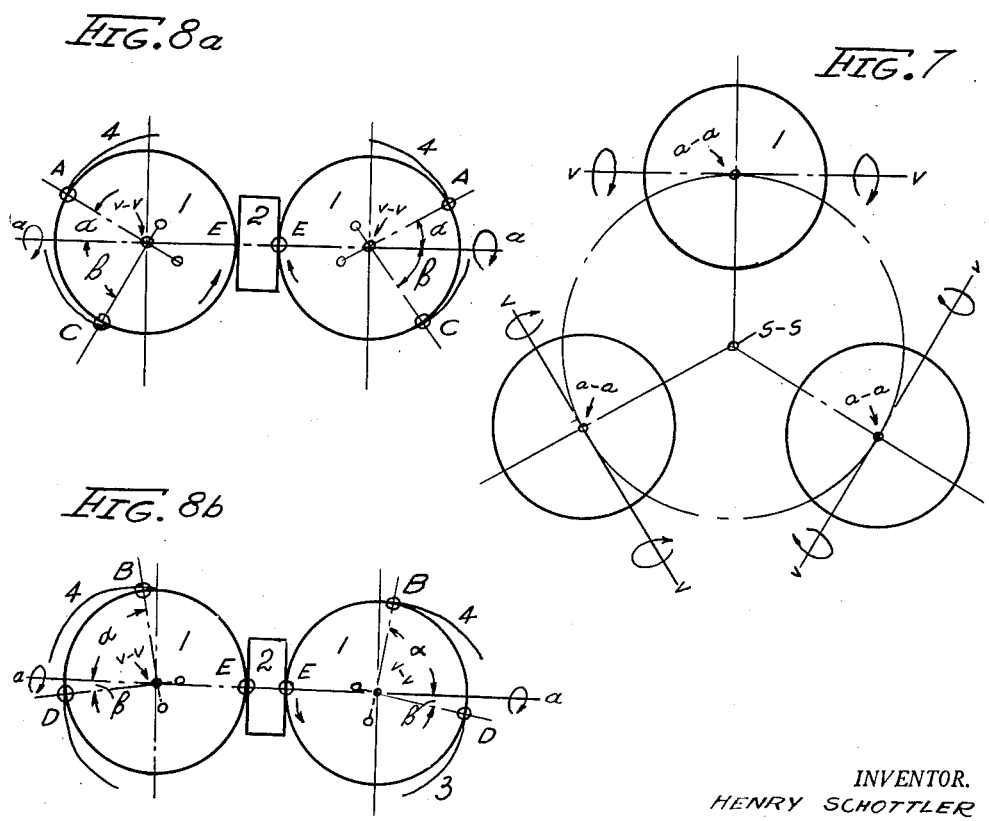

Patented Feb. 19, 1952

2,586,725

UNITED STATES PATENT OFFICE 2,586,725

VARIABLE-SPEED TRANSMISSION

Henry Schottler, New Orleans, La., assignor to Roller Gear Corporation, New York, N. Y., a corporation of New York Application February 6, 1951, Serial No. 209,543
In Switzerland February 8, 1950

18 Claims. (Cl. 74—796)

The invention relates to improvements in variable speed transmissions wherein balls are used as rolling members to transmit power from a driving shaft to a driven shaft.

Various constructions of such transmissions are known. They are, however, of low efficiency, and the working stresses, to which the ball races are exposed by the heavy pressures necessary for changing the speed ratio, exceed unduly their fatigue strength.

Therefore, all the known designs present one or more of the following drawbacks:

(1) The bearings are exposed to unusually high thrust loads.

(2) The axial forces to be applied for torque transmission and change of speed are correspondingly high.

(3) The contact paths of the rolling elements remain unchanged for varying speeds.

(4) The high axial forces are proportional to the pressures between rolling balls and races which are necessary for preventing slip. This affects unfavorably the selection of proper materials with an adequate coefficient of friction of rest, and consequently the admissible specific output, and the durability of the transmission is considerably reduced by wear, particularly if frequent speed changes are necessary.

It is a principal object of this invention to provide a transmission which obviates the drawbacks referred to.

Another object of the invention is to provide a light weight, compact, low cost unit which allows of a simple and ready adjustment of the desired torque and speed ratios while the device is in operation.

According to the invention, I arrange two sets of planetary balls revolving between inner and outer raceways as a twin drive, the opposite adjacent balls of which engage as coacting pairs a follower arranged therebetween, which transmits the power to the driven shaft. In this way, the transmission of the torque is attained by the rolling balls which revolve together in pairs in the same direction of rotation as a unit; the change of the gear ratio is accomplished by tilting either ball of a ball pair individually and symmetrically to each other in opposite directions. I prefer to guide the pairs of balls positively in axially adjustable inner and outer raceways in such a way that each pair of balls is mounted rotatably together around an axis parallel to the axis of the raceways and that the individual balls of the pairs are each rotatable around another axis which is perpendicular to the plane through the common axis of the ball pair and the parallel main axis of the drive. During the adjustment of the speed ratio, small deviations of this common axis of rotation from its parallelism to the main axis are admissible.

In this arrangement, the axially adjustable inner and outer raceways form two adjacent races on which the opposite outer caps of the balls of the pairs roll in such a manner that all axial forces generating friction of rest balance each other, whereby the bearings are relieved of any thrust. Each of the balls is supported in three points, whereby one is constantly located on the axis connecting the centers of the balls of a ball pair by the opposite inner face of the other ball of the pair, and the other two supporting points lie each on one of the raceways. This kind of support ensures that on adjusting the speed ratio the balls are shifted from one into another rolling cycle by a pure rolling movement under almost complete exclusion of sliding movement.

Any displacement of the outer raceways effects a conforming automatic displacement of the inner raceways in the opposite direction, so as to obtain a displacement of the contact circles of the balls with a corresponding change of the speed ratio.

The novel transmission has the following advantages:

(a) All the axial forces necessary for the friction of rest between the rolling elements and the components of said forces have a direction so as to exert no thrusts on the bearings. The reactions of these relatively heavy pressures appear only as tensile stresses in the driving shaft and housing and, therefore, do not affect the efficiency of the device.

(b) During the speed adjustment, the contacting lines of all rolling elements are shifted and the rolling elements roll into other rolling cycles. This ensures high efficiency because of the high admissible coefficients of friction of rest and increases the life and output of the gear.

The high efficiency of my novel transmission is preferably assisted by suitable pressure couplings which may be designated as "pressure changers" or "torque-loading devices."

The invention will be more fully explained with reference to the accompanying drawings, where:

Fig. 1 is a view in longitudinal sectional elevation of an embodiment of the invention, the plane of section being indicated by the broken line A—B of Fig. 2;

Fig. 2 is a transverse section on line C—D of Fig. 1;

Fig. 3 is a partial transverse section taken on line E—F of Fig. 1;

Fig. 4 is a transverse sectional view of the pressure changer of Fig. 1 in the plane indicated by the line G—H of Fig. 1;

Fig. 5 is a development of the pressure changer of Fig. 4 along line J of Fig. 1;

Fig. 6 is a half view in longitudinal sectional elevation of a different construction of a pressure changer;

Fig. 7 is a diagrammatic view of one set of the planetary balls, illustrating their various rotating movements, and Figs. 8a and 8b are diagrammatic illustrations of the positions and movements of one pair of balls shown for various speeds.

Upon viewing Fig. 1, it will be observed that two inner annular races 3 are mounted on the driving shaft 7 for axial displacement and free rotation. The races are preferably secured against relative rotation with respect to each other, e. g. by a suitable connecting sleeve. The inner races 3 form with corresponding stationary external races 4 a twin raceway, in which for instance six balls are disposed axially side by side in three pairs, which pairs are spaced uniformly from each other.

The pairs of balls are supported by ball bearings 6, which are radially displaceable in a cage 5 serving as a follower in such a way that the axis of rotation of the balls of each pair is always parallel to the main axis of the transmission, thereby ensuring a pure rolling movement of the balls.

In order to vary the output speed and torque of the transmission, the paths of the balls on the races have to be shifted to circles of more or less diameter. According to the invention, this shifting is brought about in a very simple manner by axial displacement of the external races which results in an opposite displacement of the inner races, thereby tilting automatically the balls into other rolling circles. The details of this construction will be explained more fully hereinafter.

It is essential that the shifting of the balls is carried out essentially by a pure rolling movement with exclusion of sliding movement. To assist this rolling shift, I prefer to provide means which ensure a radially yielding mutual support of the balls of each pair during the adjustment of the speed ratio so as to prevent losses by friction. For instance, I may arrange between the balls of each pair discs 2 which are floating or yieldingly supported in radial direction and which are held by the contact pressure exerted by the balls. I have found that a radial play of the discs 2 of about $\frac{1}{10}$ mm. or less is fully sufficient for the intended purpose. The discs are preferably flat but may have also concave surfaces.

In order to obtain for any load or torque the necessary compression between the rolling elements, pressure couplings or pressure changers have to be provided.

A suitable construction of such a pressure changer is shown by way of example in Figs. 1, 4 and 5. At the outer sides of the inner races 3, there are bushings 13 keyed on the driving shaft 7; sleeves 11 are mounted on the bushings 13 slidingly in axial direction but secured against relative rotation to them. Wedge-like projections 10 of the sleeves 11 and similar projections 9 of the inner races or of discs solidary with said races form raceways (Fig. 5) for rolling elements, e. g. balls 12, so as to transmit the axial pressures proportionally to the torque symmetrically from the driving shaft 7 to the two inner races 3 and as to permit at the same time an axial displacement of said races. Coil springs 14 exert at all times an axial pressure on the balls 12 carried between the wedge-like projections 10 and 9, and, therefore, on the inner raceways 3. This ensures that the driving and driven elements of the transmission are positively engaged even in idle operation where there is no torque to be transmitted, and that the balls 12, which are carried in recesses of a freely rotatable disc 27 (Fig. 4), are maintained by means of friction between the projections 10 and 9 in their rolling position corresponding to the position imparted to the main elements of the transmission.

Another embodiment of a suitable pressure changer is shown in Fig. 6. In this modification, a planetary bevel gear system 29, 30, 31 is employed to maintain the balls 12 in their position and the coil springs 14 exert their action not on the balls 12 but directly or indirectly on the inner raceways 3.

The positive control of the rolling elements of the pressure changers, required by the longitudinal displacement of the inner raceways 3, may be performed also by means other than shown in the drawings, such as planetary pinions, lever arrangements, and the like.

The problem of the positive control of rolling elements as a function of the axial displacement of the raceways arises not only in connection with the inner raceways 3 but also in connection with the external raceways 4, where it may be solved in a similar manner. As will be noted on inspection of Fig. 1, the external raceways 4 are stationary during the transmission of the torque from the driving to the driven shaft and are, for instance, slidingly connected to the bushing of the worm wheel but secured against relative rotation to this bushing. The outward plane faces of the raceways 4 are provided with uniformly spaced wedge-shaped projections 16 which cooperate with similar wedge-shaped projections 32 of rings 20 fixedly secured to the bipartite transmission housing 18, 19. The projections 16 and 32 form races for balls 17. When the external raceways 4 are turned by turning the worm 21 in one direction by means of a (not shown) hand wheel or another device, the balls 17 roll on the race formed by the projections 16 and 32 and displace the raceways against the balls 1. If the worm 21 is turned in the other direction, the raceways 4 are displaced in the opposite direction. Springs 22 press outwardly against the raceways 4 so as to ensure a positive adjustment of the raceways in both directions by suitable turning of the worm.

In the shown modification of the novel transmission the output torque is transmitted in the common axis of the two balls of each ball pair to the ball bearing (balls 6) mounted displaceably in radial direction in the follower 5, and, therefore, to the follower 5 itself. The follower 5 is mounted for free rotation on the shaft 7 and is coupled to a member 8, which transmits the output speed to the driven shaft 26 by means of planetary wheels 23, a pinion 24 mounted directly on the driving shaft 7 and a toothed gear 25 connected with the driven shaft. According to the selection of the relative diameters of the planetary wheels any desired range of output speeds to zero or for both directions of rotation may be obtained.

In order to describe the operation of the novel transmission, it may be assumed that the shaft 7 be driven with a constant speed of revolutions. The pressure changers press the inner raceways 3 against the balls 1 and rotate them by friction. The balls 1 perform a planetary motion and revolve relatively to both raceways. As both balls of a ball pair roll on circles of equal diameter, there is no relative movement between said balls. The abutting discs 2 located between the balls are carried around by the balls.

The speed is reduced according to the contact positions between the rolling elements and transmitted to the cylindric member 8, which transmits it to the driven shaft 26.

The adjustment of the output speed is brought about by turning the worm 21. In this way the external raceways 4 are turned by the worm wheel 21 and are axially displaced by the balls 17 rolling on the wedge-shaped raceways 16. For reducing the output speed the external raceways are pressed together; as a a result thereof, the balls 1 are pivoted on a transverse axis and change their contact circles on the inner raceways 3 in such a way as to force said raceways outwardly against the pressure of the pressure changer. To increase the output speed, the opposite axial displacement of the external and inner raceways has to take place.

The rotatory movements performed by the balls 1 arranged in planetary fashion are indicated in Fig. 7 where the axis S—S of the shaft and the raceways and the axes of rotation $a$—$a$ form a right angle with the plane of the drawing. V—V are the spin axes of the balls, which are perpendicular to the planes through the common axes of the ball pairs and the parallel main axis of the drive.

Figs. 8a and 8b show diagrammatically the rotatory movements of the balls of a pair around the axes of rotation $a$—$a$, which are parallel to the axis of the main shaft, and their opposite symmetrical spin around the spin axes V—V, which are perpendicular with respect to the plane of the drawing; Fig. 8a represents the low, and Fig. 8b the high speed position. When the driving speed is increased, the balls 1 of a ball pair roll in opposite directions from the contact points A and C to the points B and D while the distance of the third support point E from the axis of the raceways is slightly changed. There is no friction between the balls 1 of a pair and the disc 2 associated therewith; nor is there friction between the balls 1 and the raceways at the contact point receiving the higher thrust while the friction at the contact point receiving the smaller thrust is very small. Therefore, there is hardly any gliding movement between the rolling elements, and only very light forces are required to vary the speed ratio of the transmission.

The transmission can be very economically manufactured in compact units with the use of standard machine elements. The main elements combine small size with large torque capacity and are so arranged as to compensate completely the thrusts to which they are subjected, thereby relieving the shaft bearings from said thrusts. Because of the symmetrical arrangement of the rolling elements and races, the relatively strong axial forces necessary for torque transmission generate only tensile stresses in the shaft and housing, i. e. they do not affect the degree of efficiency.

The correlation of the action of the pressure changers with the varying rolling speeds of the spherical planet pairs on the raceways results in favorably high forces of friction of rest over the whole transmission range. It may be stated that all balls 1 share equally in the transmission of the torque.

If the ball pairs are located side by side in the raceways without interposed discs 2, it is no longer possible to retain the free rolling movement of the balls when the speed is varied.

While I have illustrated and described certain embodiments of this invention, modifications thereof may be made without departing from the principle of the invention. For instance, the function of fixed driving and driven members may be transposed when different ranges of the gear ratio are desired. Instead of the balls of the torque loading device and of the adjustment means, barrel-shaped or conical rolling elements may be used. The transmission of the torque from the planetary balls to the retaining follower may be brought about not by the ball bearings shown but by elements rolling directly on said balls in combination with suitable raceways. Also swing bearings or rolls contacting the balls may be used.

What I claim is:

1. A variable speed transmission of the planetary type comprising in combination a driving shaft, a driven shaft, a pair of inner races and a pair of outer races, one of said pairs being coupled to the driven shaft, the other pair being held stationary against rotation, the races of each pair being symmetrically shiftable to each other and in opposite direction to the corresponding races of the second pair, two sets of spaced balls revolving in a planetary motion, one set between one inner and the corresponding outer race, the second set between the oppositely arranged inner and outer race, all balls of the one set thrusting axially against the corresponding balls of the other set to form uniformly revolving pairs of balls, and a follower between the two sets of balls and in engagement with them arranged for free rotation on the driving shaft and in operative connection with the driven shaft.

2. A variable speed transmission of the planetary type comprising in combination a driving shaft, a driven shaft, a pair of inner races and a pair of outer races, one of said pairs being coupled to the driving shaft, the other pair being held stationary against rotation, the races of each pair being symmetrically shiftable to each other and in opposite direction to the corresponding races of the second pair, two sets of spaced balls revolving in a planetary motion, one set between one inner and the corresponding outer race, the second set between the oppositely arranged inner and outer race, all balls of the one set thrusting axially against the corresponding balls of the other set to form uniformly revolving pairs of balls, a follower between the two sets of balls and in engagement with them arranged for free rotation on the driving shaft, and controlling means to tilt the balls of each pair with respect to each other by equal and opposite angles, thereby varying the transmission ratio.

3. A variable speed transmission of the planetary type comprising in combination a driving shaft, a driven shaft, a pair of inner races and a pair of outer races, one of said pairs being coupled to the driving shaft, the other pair being held stationary against rotation, the races of each pair being symmetrically shiftable relative to each other and in opposite direction to the corresponding races of the second pair by controlling means operatively connected to at least one pair of races, two sets of spaced balls revolving in a planetary motion, one set between one inner and the corresponding outer race, the second set between the oppositely arranged inner and outer race, all balls of the one set thrusting axially against the corresponding balls of the other set to form uniformly revolving pairs of balls, and a follower between the two sets of balls and in engagement with them arranged for free rotation on the driving shaft and in operative connection to the driven shaft.

4. A variable speed transmission of the planetary type comprising, in combination a driving shaft, a driven shaft, a pair of inner races and a pair of outer races, one of said pairs being coupled to the driving shaft, the other pair being held stationary against rotation, the races of each pair being symmetrically shiftable relative to each other and in opposite direction to the corresponding races of the second pair by controlling means operatively connected to one pair of races, and spring means for automatically controlling the second pair of races, two sets of spaced balls revolving in a planetary motion, one set between one inner and the corresponding outer race, the second set between the oppositely arranged inner and outer race, all balls of the one set thrusting axially against the corresponding balls of the other set to form uniformly revolving pairs of balls, and a follower between the two sets of balls and in engagement with them arranged for free rotation on the driving shaft and in operative connection to the driven shaft.

5. A variable speed transmission as defined in claim 1, in which the coupling between the inner races and the driving shaft is effected by a torque loading means generating axial pressure on the inner races proportional to the input torque.

6. A variable speed transmission as defined in claim 5 wherein the torque loading means consists of bushings secured to the driving shaft, axial projections on the inner races having inclined faces, opposite projections on the bushings with conforming inclined faces, rolling elements rolling in the grooves formed by said inclined faces, and spring means pressing the rolling elements against the inner races.

7. A variable speed transmission as defined in claim 1, the follower being of disc-like shape and having spaced recesses, ball bearings arranged in said recesses with their axes parallel to the axis of the driving shaft and with radial clearance, the inner races of these ball bearings being adapted to engage the spaced pairs of balls and to hold them aligned for torque transmission.

8. A variable speed transmission as defined in claim 7 comprising cup-like projections in the inner races of the ball bearings embracing the balls of each pair of balls.

9. A variable speed transmission as defined in claim 1 comprising floating discs interposed between the balls of each pair of balls, said discs being held in floating position by the pressure exerted by the balls.

10. A variable speed transmission as defined in claim 1 in which a cylindrical member for transmitting rotation from the follower to the driven shaft is secured to the follower in the spaces intermediate the balls and encircles the inner race at the side of the driven shaft.

11. A variable speed transmission as defined in claim 10, in which the connection between the cylindrical member and the driven shaft is effected by a planetary gearing consisting of a planetary gear revolving with the cylindrical member and meshing with a pinion on the driving shaft and a follower gear on the driven shaft.

12. A variable speed transmission as defined in claim 1 comprising means for causing the balls of each pair of balls to carry out a substantially pure rolling movement on each other during adjustment of the gear ratio by tilting said balls.

13. A variable speed transmission of the planetary type comprising in combination a stationary housing, a driving shaft, a driven shaft, a pair of inner races relatively movable to each other in axial direction and operatively connected with said driving shaft, a pair of outer races relatively movable to each other in axial direction, said pairs of races forming a circular groove, means to turn said outer races with respect to the housing thereby axially displacing said races by equal and opposite amounts, a plurality of balls rolling as spaced pairs in the groove formed by said pairs of inner and outer races, each of said balls having a point of contact with one of the inner and with one of the outer races, a follower mounted for free rotation around the driving shaft and operatively connected with the balls and the driven shaft for transmitting the torque, means carried by said follower to support adjustably in radial direction the balls of each pair of balls for free rotation around an axis parallel to the axis of the races and for planetary motion about said latter axis, means on the driving shaft for generating an axial pressure on the inner races proportional to the input torque, and a yielding friction transmission between said inner races and said torque loading means for automatic displacement of the inner races in a direction opposite to the positive displacement of the corresponding outer races, thereby rolling the balls in other contact circles with the races for varying the speed ratio.

14. A variable speed transmission as defined in claim 13 comprising a pressure device interposed between the stationary housing and the positively rotatable outer races for reducing the force to control the inward displacement of the outer races, said pressure device comprising a number of projections on the outer races extending in axial direction and having inclined faces, opposite pressure plates having conforming inclined faces, and rolling elements between said inclined faces.

15. A variable speed transmission as defined in claim 14 comprising a manually rotatable bushing in the housing and a worm drive connection with it and engaging the outer races so as to turn and simultaneously displace the outer races in coaction with said pressure device.

16. A variable speed transmission as defined in claim 14 comprising pre-set springs pressing the outer races against said pressure device.

17. In a variable speed transmission, in combination, a driving shaft, a driven shaft; a twin drive comprising a pair of inner and a pair of outer races, the races of each pair being relatively movable to each other in axial direction to form a groove of adjustable width, one pair of said races being operatively connected with the driving shaft, and paired balls rolling in said groove; a follower in the symmetry plane of the twin drive mounted for free rotation around the driving shaft and operatively connected with the driven shaft, said follower supporting the paired balls in parallelism to the axes of the twin drive and transmitting the torque exerted on it by said balls to the driven shaft.

18. A variable speed transmission as defined in claim 1, in which the generating curves of the contacting surfaces of the inner and outer races form arcs of a circle the diameter of which is larger than the diameter of the balls.

HENRY SCHOTTLER.

REFERENCES CITED

The following references are of record in the file of this patent:

UNITED STATES PATENTS

| Number | Name | Date |
|---|---|---|
| 1,585,140 | Erban | May 18, 1926 |
| 2,205,768 | Pearce | June 25, 1940 |
| 2,209,497 | Winger et al. | July 30, 1940 |

FOREIGN PATENTS

| Number | Country | Date |
|---|---|---|
| 477,537 | Great Britain | Jan. 3, 1938 |
| 108,417 | Sweden | Sept. 7, 1943 |